(12) United States Patent
Hammond et al.

(10) Patent No.: US 8,636,864 B2
(45) Date of Patent: Jan. 28, 2014

(54) ARTICLE AND METHOD FOR FORMING A WIRE SEAL

(75) Inventors: Philip Hammond, Wiltshire (GB); Giles H. Rodway, Wiltshire (GB); Martyn Priddle, Wiltshire (GB)

(73) Assignee: Tyco Electronics UK Ltd., Wiltshire (GB)

( * ) Notice: Subject to any disclaimer, the term of this patent is extended or adjusted under 35 U.S.C. 154(b) by 0 days.

(21) Appl. No.: 12/727,920

(22) Filed: Mar. 19, 2010

(65) Prior Publication Data

US 2010/0170611 A1 Jul. 8, 2010

Related U.S. Application Data

(63) Continuation of application No. PCT/GB2008/003137, filed on Sep. 16, 2008.

(30) Foreign Application Priority Data

Sep. 20, 2007 (GB) .................................. 0718320.5

(51) Int. Cl.
*B32B 7/02* (2006.01)
(52) U.S. Cl.
USPC ............................. 156/86; 156/85; 428/34.9
(58) Field of Classification Search
USPC ....................... 156/86, 85; 428/34.9
See application file for complete search history.

(56) References Cited

U.S. PATENT DOCUMENTS

| | | | |
|---|---|---|---|
| 3,983,070 A | | 9/1976 | Penneck |
| 4,343,844 A | * | 8/1982 | Thayer et al. ................. 428/34.9 |
| 4,555,422 A | | 11/1985 | Nakamura et al. |
| 4,634,615 A | * | 1/1987 | Versteegh et al. ............. 138/141 |
| 5,015,512 A | | 5/1991 | Matsumoto |
| 5,298,300 A | * | 3/1994 | Hosoi et al. .................. 428/34.9 |
| 5,324,564 A | | 6/1994 | Chiotis et al. |
| 5,346,539 A | * | 9/1994 | Hosoi et al. .................. 106/18.12 |
| 2003/0131940 A1 | * | 7/2003 | Saito .......................... 156/379.8 |

FOREIGN PATENT DOCUMENTS

| | | | | |
|---|---|---|---|---|
| CA | 1333302 | * | 3/1987 | ............. C09J 175/04 |
| DE | 3346028 A1 | | 6/1985 | |
| EP | 0376461 A2 | * | 7/1990 | ............. C09J 123/08 |
| EP | 0626742 A2 | | 11/1994 | |
| EP | 1821374 A2 | | 8/2007 | |
| GB | 2329485 A | * | 3/1999 | ............. G02B 6/255 |
| JP | 202616 | | 10/1985 | |
| WO | 9731213 | | 8/1997 | |

OTHER PUBLICATIONS

Jianye Wen, Sr. Research Chemist, and Darrel Bryant, Sr. Techincal Service Specialist, "Fumed Silica Controls Rheology of Adhesives and Sealants", Oct. 5, 2000, ASI (Adhesives and Sealants Industry), Cabot Corp.*
PCT International Preliminary Report on Patentability issued in co-pending International Application No. PCT/GB2008/003137, dated Mar. 24, 2010, 6 pages.
Raychem "RBK-ILS-125" Article dated Oct. 1996, 2 pages (Retrieved from the Internet on Jan. 28, 2009: http://www.semitek.cz/tyco/raychem/cab leprotection/rkils125.pdf).
International Search Report for copending international application PCT/GB2008/003137, dated Jan. 29, 2009, 4 pages.
Written Opinion of the ISA for copending international application PCT/GB2008/003137, dated Jan. 29, 2009, 7 pages.
UK Patent Search Report cited in Application No. GB0718320.5 dated Jul. 28, 2008, 4 pages.

* cited by examiner

*Primary Examiner* — Jeff Aftergut
*Assistant Examiner* — Jaeyun Lee
(74) *Attorney, Agent, or Firm* — Barley Snyder

(57) ABSTRACT

A heat-shrinkable tubular article for forming a wire splice is both resistant to high temperatures and capable of rapid installation. The heat-shrinkable tubular article includes a heat-shrinkable jacket material and an inner adhesive layer having a thixotropic heat-flowable additive. The tubular article having at least one of a maximum internal diameter of no more than 15 mm or a maximum length of no more than 100 mm.

32 Claims, No Drawings

ARTICLE AND METHOD FOR FORMING A WIRE SEAL

CROSS-REFERENCE TO RELATED APPLICATIONS

This application claims the benefit of the filing date under 35 U.S.C. §119(a)-(d) of International Patent Application No.: PCT/GB2008/003137 filed Sep. 16, 2008, which claims the priority of United Kingdom Patent Application No. GB 0718320.5 filed on Sep. 20, 2007.

FIELD OF THE INVENTION

This invention relates to an apparatus and method for performing a wire seal, and in particular, to a heat-shrinkable tubular article for sealing a wire splice.

BACKGROUND

Wire splices are commonly used in electrical harnesses in the automotive industry, and dimensionally recoverable tubing is often used to protect spliced wires within electrical harnesses in the automotive industry. One of the most common splice configurations is an "inline splice". In an inline splice, each wire to be spliced has an electrically insulative covering removed (e.g. at one end, or at one or more other locations) to expose bare electrically conductive wire. In some other kinds of splice, removal of an insulative covering is not necessary. The wires to be joined are then arranged as required with all of the exposed bare wires essentially parallel and overlapping each other.

The bare wires are then crimped, welded, soldered or otherwise joined together to form a splice nugget. Subsequently, the nugget and the adjacent exposed conductors must be protected and sealed from the external environment. A preferred means for protecting the nugget and sealing out moisture and other contaminants is to encase the nugget in a dimensionally recoverable tubing, which has a sealant/adhesive interior layer or liner, thereby forming a wire seal. Typically, heat is applied to cause the sealant/adhesive liner to flow, while simultaneously causing the tubing to heat-recover (shrink) about the nugget. The tubing shrinks around the exposed wires and the adhesive/sealant flows within the tubing to cover and seal the exposed wires. The adhesive/sealant also flows along the wires to contact and cover a portion of the unstripped, electrically insulative wire covering. This provides a seal over the entire length of the exposed wires and the splice nugget, up to and including the beginning of the insulative wire covering, and thus prevents water from entering the splice and/or from flowing along the conductors inside the wire insulation. Wire butt splices and wire splices to ring terminals or other termination devices can also be sealed and protected in this way.

In addition, connectors may be sealed against water ingress and bundles of wires blocked using adhesive inserts in combination with heat shrink tubing.

The complexity of vehicle harnesses, and the number of wire splices incorporated in the harnesses, are increasing due to the growing number of electrical functions on modern vehicles. As a result, vehicle manufacturers are using an increasing number of splice sealing products to ensure electrical integrity and guarantee reliability. In order to maximize productivity and minimize cost, it is therefore desirable to minimize the time it take to seal a splice.

A variety of heat-shrinkable splice seal sleeves are commercially available. An example of these is dual-wall heat-shrinkable splice seal sleeve that is a tubular construction having an outer cross-linked polymer heat-shrinkable sleeve in combination with an inner heat-flowable adhesive/sealant liner. When heated, the tubing shrinks and the adhesive/sealant layer melts and flows. Such products are well known in a range of different materials and sizes, and are used in various industries for environmental sealing of cable and wire splices. The products are installed by sliding the sleeve and liner over the area to be sealed and heating using a heat gun, flame, infrared, or other heat source to shrink the tubing. The minimum time taken to achieve a sealed splice depends on a number of factors including the number and size of the component wires that make up the splice, the size of the tube, the recovery temperature of the tube, the melting temperature of the adhesive liner, the viscosity of the liner at the recovery temperature, the hoop stress of the tubing at the recovery temperature, the temperature of the copper nugget, the type of heating device employed and its thermal characteristics.

For convenience herein all such structures are referred to as "splices" and, as the context requires, "splice seals", although in practice some of the structures to which the invention relates may not require actual splicing together of conductors or other filaments.

It is that known that heat-shrinkable splice seal sleeves are generally either capable of rapid installation or having high temperature resistance.

Rapid installation type splice seal sleeves generally include an adhesive with relatively low viscosity at the installation temperature. This rapid installation characteristic makes them commercially attractive, especially in high-throughput environments. However, the adhesive in such splice seal sleeves typically flows excessively in service at the rated temperature, which renders it unsuitable for high temperature environments. Alternatively, high-temperature resistant splice seal sleeves tend to be manufactured with an adhesive, which has relatively high viscosity at the service temperature, rendering them suitable for use in high temperature environments. However, such an adhesive slows down the rate of product installation, thereby undesirably slowing the production process. In particular, although the manufacturing process is only slowed by a few seconds with high-temperature rated splice seal sleeves, compared to rapid installation ones, when production is carried out on a large scale, as it is in the automotive industry, the extra delay results in a significant costs.

Once installed, the splice seals must meet certain specification requirements, which are designed to reflect the use environment. In the automotive industry, these specifications include sustained sealing during immersion in fuel, temperature cycling and high temperature flow resistance, to reflect the engine compartment environment. To meet these requirements and sustain a seal, the installed adhesive should be resistant to flow at relatively high temperatures. Two of the key requirements for an automotive splice seal are rapid installation and, once installed, minimal adhesive flow in a vertical position at 150° C. The technical solutions to these requirements are in direct conflict—low adhesive viscosity for rapid installation, and yet high viscosity for flow inhibition once installed.

It is known to provide hot-melt adhesives having ethylene vinyl acetate (EVA) copolymers, which copolymers additionally include 1% to 15% fumed silica. The hot melt adhesives are typically used may be used to provide glue sticks which may be used in hot-melt guns. The resultant glue sticks are said in use to be less prone to stringing, and to provide a sag-resistant melt.

U.S. Pat. No. 3,983,070 describes adhesives which are said to be particularly useful in bonding polymeric materials used in encapsulation and termination of insulated electrical conductors. The adhesive includes a polar copolymer of an a olefin and an inorganic silicon-containing compound. The adhesives used in the context of this document are said to be particularly useful for providing the internal coatings of heat-shrinkable sleeves and end caps for cable joints and termination, especially in telephone cables, and preferably have a melt flow index less than 5. The use of the silica-containing adhesive is said to increase the strength of the bonds obtained between cross-linked polyethylene and the lead sheaths of cables, as well as to provide a high peel strength at temperatures as high as 70° C. Telephone cables however typically have dimensions which are substantially greater than those contemplated by the splice seal sleeves of the present invention.

As disclosed in the description, the silicon-containing compound is a chemically treated silica filler, such as Aerosil R972. The resultant adhesive is said to provide a high bond strength when e.g. bonding a polymeric material to another polymeric material, or to another substrate, and also to provide desirable electrical characteristics, and may particularly be used where heat-recoverable materials are used to effect the encapsulation or termination.

There has been a need, especially in high-volume production of wiring harnesses to be installed into cars and other vehicles, for a heat-shrinkable splice seal sleeve capable of rapid installation and having high temperature resistance, because of conflicting requirements for flow characteristics of the adhesive.

SUMMARY

It is an object of the invention to prepare a heat-shrinkable tubular article for sealing a wire splice, the heat-shrinkable splice capable of rapid installation as well as high temperature resistance.

The heat-shrinkable tubular article for sealing a wire splice includes a heat-shrinkable jacket material, and a thixotropic heat-flowable inner adhesive layer. The dimensions of the tubular article includes at least one of a maximum internal diameter no more than 15 mm or a maximum length no more than 100 mm. In some instances, the tubular article may have both of these maximum dimensions.

DETAILED DESCRIPTION OF THE EMBODIMENT(S)

A heat-shrinkable tubular article for sealing a wire splice, according to the invention includes a high temperature resistance adhesive layer, and is capable of rapid installation.

The heat-shrinkable tubular article includes a heat-shrinkable jacket material, and a thixotropic heat-flowable inner adhesive layer. The thixotropic heat flowable adhesive includes an adhesive that contains an additive (i.e. untreated silicas), which provides the adhesive with thixotropic properties. I The adhesive, according to the invention, can be any adhesive, provided it is a hot melt adhesive having good filler compatibility. The adhesive could have a Melt Flow Index (MFI) greater than 5, as determined by ASTM D1238 (modified). Conveniently, the thixotropic heat-flowable inner adhesive layer (i.e. incorporating the thixotropic additive) has a Melt Flow Index greater than 10, preferably greater then 20, preferably greater than 50, and in some embodiments preferably greater than 100 or even greater than 500. Suitably, the adhesive is an ethylene vinyl acetate (EVA) copolymer adhesive. EVA copolymer adhesives, according to the invention, may have a vinyl acetate content of 15% to 40% by weight; particularly EVA copolymer adhesives should have a vinyl acetate content of 25% to 28% by weight.

The adhesive, according to the invention, may be a high flow thixotropic adhesive; by this is meant that the adhesive flows under the installation conditions to block and seal the joint seal, but in subsequent use it must not flow significantly at 150° C.

In more detail, the adhesive according to the invention and used in the heat shrinkable tubular article, could flow under shear at a temperatures less than 130° C., or even less than 120° C. In such instances, the shear is provided by the heat recoverable jacket material shrinking However, the adhesive may not flow at a temperature of 150° C.

In a further aspect of the invention, there is provided a heat shrinkable tubular article for sealing a wire splice having a heat-shrinkable jacket material and a thixotropic heat flowable inner adhesive layer, the adhesive layer flowing under shear at a temperature of no less than 130° C., but not flowing at a temperature of 150° C.

Determination of flow in such instances may conveniently be done by determining whether the adhesive flows substantially from a sealed splice post-installation when hung vertically at the appropriate temperature (e.g. 150° C.) for 24 hours.

The additive that provides the adhesive with the thixotropic properties, making it a thioxtropic adhesive, is preferably a silica. Suitable silicas for use according to the invention accord to the adhesive thixthropic properties, and are typically high surface area silicas, e.g. fumed silicas, conveniently with a surface area greater than 100 $m^2/g$. Other additives which confer on the adhesive thixotropic properties may also be suitable, and would typically be high surface area mineral fillers, such as for example Bentonite or Garamite. Conveniently, the additive which provides the adhesive with thoxtropic properties may present in the adhesive at a level of 1% to 15% by weight, 2% to 10% by weight, and in some embodiments 5% to 7% by weight of the adhesive.

The heat-shrinkable splice seal sleeves of the invention are particularly suitable for use when sealing wire splices, typically with a diameter of less than 12 mm. As such, the unrecovered heat-shrinkable splice seal sleeve of the invention will typically have an internal diameter of less than approximately 20 mm, or less than approximately 15 mm.

Since they are only used for sealing splices made up from wires, the heat-shrinkable tubular articles according to the invention has a length no more than 100 mm, and in certain embodiments less than 80 mm or less than 70 mm.

According to a further aspect of the invention, there is provided a method of forming a splice seal between two or more wires including the steps of (i) heating a heat-shrinkable tubular article (e.g. sleeve) having a heat-shrinkable jacket material and a heat-flowable thixotropic inner adhesive layer, and (ii) causing the heat-shrinkable tubular article to shrink and form the splice seal.

In a further aspect of the invention there is provided a method of forming a heat-shrinkable tubular article suitable for forming a splice seal between wires, including the step of co-extruding a heat-shrinkable jacket material and a heat-flowable thixotropic inner adhesive layer. According to the invention, the co-extruded jacket material and adhesive layer article may be cut to lengths no longer than 100 mm.

The heat-shrinkable splice seal sleeves of the invention, incorporating the adhesive containing the thixotropic additive, have been found to confer on the splice seal sleeve and the resultant wire splice seal not only good high temperature resistance, and thereby passing the requisite vertical drip performance tests, but also good (i.e. rapid) installation times. The rapid installation times observed help maintain the economic benefits of known fast shrink splice seal sleeves, and are surprising in the light of the incorporation of a thixotropic additive, which might otherwise have been expected to slow down installation times.

The heat shrinkable splice seals of the invention are suitable for use in any known seal forming procedure, using known equipment for heating and forming such splice seals.

A suitable heating device for forming a splice seal according to the invention is a RBK Processor MkII, available from Tyco Electronics.

A heat-shrink tubular article, suitable for use in a method according to the invention, has a clear (that is substantially non-light-absorbing) jacket and black liner and is based on the high density polyethylene jacket in combination with an EVA based liner containing 7% fumed silica, with a surface area of 200 m$^2$/g, and 0.5% colour masterbatch, which incorporates the equivalent of 0.0125% carbon black. The jacket and liner are co-extruded to create an effective interface for heat transfer from the liner to the jacket.

To seal a splice, a sealant material could flow around and between the bare component wires of a metal nugget, where the polymer insulation has been removed. In a dual wall heat-shrink product the liner may therefore be heated to the point at which the adhesive will flow under the shear generated by the shrinking jacket material, and then be forced in to and around the nugget and insulation by the heat-shrink jacket. It is also important that the resultant seal may be able to block the ingress of water.

According to the invention, the jacket and liner used in such a method are co-extruded. It is also possible that the liner is or includes a layer of adhesive material. In an alternative arrangement, the inner layer (liner) may be coated onto the jacket interior.

The invention will now be further described with reference to the accompanying samples.

In one sample, an EVA adhesive having 92% EVA copolymer (28% vinyl acetate, MFI 500 dg/min), 5% tackifier and 3% antioxidant was utilized. The adhesive typically generate a splice seal in approximately 5 seconds. However, at temperatures of 120° C. or higher, when the splice seal is vertically suspended, the adhesive flows and drips out of the sealed splice area, which renders it unsuitable for use in certain European applications.

In other samples, the adhesive was then mixed with a small internal mixer (Brabender) with fumed silica of surface area 200 m$^2$/g (5% & 7% addition level, see table below) and carbon black (0.0125 wt %). The filler was added at 120° C., and was mixed at 32 rpm for 15 minutes. From each mix, 0.2 to 0.3 mm thick slabs were pressed at 160° C.

The heat-shrink jackets used were hand-prepared. Thus, a splice seal product included the adhesive lining carefully removed, leaving the high density polyethylene heat-shrink jacket material. Measured sheets of adhesive prepared as described above were cut such that there was minimum overlap of adhesive when rolled and placed inside the heat-shrink jacket material. The jacket/adhesive assembly was then placed onto a 10 mm PTFE mandrel, which was heated inside an infrared heating device, to melt the adhesive and consolidate the jacket and adhesive. After cooling in cold water, the dual wall product was removed from the PTFE mandrel.

The samples were used to seal splices in an RBK Processor MkII, which was set at 500° C. The splices prepared were 7:4 1.5 mm$^2$, i.e. on one side of the splice were 7×1.5 mm$^2$ wires, on the other side were 4×1.5 mm$^2$ wires. The time taken to seal was the shortest time in which 5 consecutive samples were installed and passed a 1 bar air pressure test.

Approximately, 5 samples of each type of adhesive were suspended vertically in an air circulating oven, at the temperature shown in Tables 1 and 2. The distance moved by the adhesive was recorded, as drip performance.

Observations are detailed in Table 1, showing the effect on installation characteristics (time to seal) and elevated temperature performance (resistance to drip) when a preferred type of particulate filler, e.g. fumed silica, is used.

TABLE 1

| Formulation | Time to Install (Secs) | Drip performance at 150° C.[1] |
|---|---|---|
| EVA adhesive | 5 | 250 mm+ |
| EVA adhesive + 5% fumed silica | 5 | 0 mm |
| EVA adhesive + 7% fumed silica | 5 | 0 mm |

The examples given in Table 2 are by way of comparison showing the effect on installation and elevated temperature performance when an alternative type non-preferred non-thixotropic particulate filler (e.g. magnesium hydroxide) was used.

TABLE 2

| Formulation | Time to Install (Secs) | Drip performance at 120° C.[1] | Drip performance At 130° C.[1] |
|---|---|---|---|
| EVA based adhesive | 5 | 250 mm+ | 250 mm+ |
| EVA base + 5% Mg(OH)$_2$ | 6 | 50 mm | 160 mm |
| EVA base + 10% Mg(OH)$_2$ | 7 | 90 mm | 150 mm |
| EVA base + 15% Mg(OH)$_2$ | 8 | 120 mm | 140 mm |

[1]Drip performance measured on splice hung vertically in an air circulating oven. Adhesive flow measured in mm after 24 hours. N.B. maximum value measurable = 250 mm.

Table 1 shows the effect of fumed silica on adhesive drip performance, i.e. 0 mm being no drip, and therefore advantageous. Addition of 5% or 7% fumed silica eliminated drip at temperatures up to 150° C., but had no measurable detrimental effect on installation time.

The adhesive with fumed silica is acting in a thixotropic manner. That is, at low shear rates the material is relatively viscous, resisting drip, whereas at higher shear rates (driven through small wire gaps by recovery of the heat-shrinkable outer jacket) the material has lower viscosity, allowing relatively easy installation.

Therefore, the EVA adhesive having a thixotropic particulate filler displays a benefit in drip performance without any apparent consequences in installation time.

If an alternate non-thixotropic particulate filler is added to the EVA adhesive, the effect is not readily observed, as shown in Table 2. In this case, as the quantity of magnesium hydroxide is increased, the improvement in drip performance is modest, and could be explained by filler increasing the viscosity of the base material. In any event, the drip properties at 120° C. and 130° C. suggest the adhesive would be unsuitable for service at 125° C.

With the magnesium hydroxide filler, as the quantity increases so the installation time increases; this too could be a result of increasing viscosity by filler addition.

The invention as set out herein includes within its scope all such splices, harnesses, seals and blocks as may be formed using dimensionally recoverable tubing having a liner that may be caused to flow upon heating. Thus the invention includes, in addition to the aforementioned structures, structures such as ring terminal seals, stub splice seals, various kinds of connector seal and various kinds of bundling block.

Besides these, the configurations described in the above-described embodiment can be selected optionally or can be changed appropriately in to other configurations without departing from the spirit and scope of the present invention.

What is claimed is:

1. A heat-shrinkable tubular article for forming a wire splice comprising:
   a heat-shrinkable jacket material; and
   a thixotropic heat-flowable inner adhesive layer flowable from shear generated by shrinking of the heat-shrinkable jacket material and having an additive with untreated silica which provides the adhesive layer with thixotropic properties, the tubular article having at least one of a maximum internal diameter of no more than 15 mm or a maximum length of no more than 100 mm.

2. The tubular article according to claim 1, wherein the tubular article has a maximum internal diameter of no more than 15 mm and a maximum length of no more than 100 mm.

3. The tubular article according to claim 1, wherein the adhesive has a Melt Flow Index greater than 5.

4. The tubular article according to claim 3, wherein the adhesive has a Melt Flow Index greater than 100.

5. The tubular article according to claim 1, wherein the adhesive is an ethylene vinyl acetate copolymer adhesive.

6. The tubular article according to claim 5, wherein the ethylene vinyl acetate copolymer adhesive has a vinyl acetate content of 15% to 40% by weight.

7. The tubular article according to claim 1, wherein the silica has a surface area greater than approximately 100 $m^2/g$.

8. The tubular article according to claim 1, wherein the additive is a high surface area mineral filler.

9. The tubular article according to claim 1, wherein the additive which is present at a level of 1% to 15%, preferably 2% to 10% by weight of the adhesive.

10. The tubular article according to claim 1, wherein the tubular article is suitable for splicing together wires of diameter less than 5 mm or less than 3 mm.

11. The tubular article according to claim 1, wherein the tubular article has a maximum internal diameter less than 13 mm.

12. The tubular article according to claim 1, wherein the adhesive in the article does not flow at a temperature of 150° C.

13. The tubular article according to claim 1, wherein the adhesive in the article flows at temperatures less than 130° C. under shear.

14. The tubular article according to claim 1, further comprising a transparent heat-shrinkable jacket.

15. The tubular article according to claim 1, wherein the adhesive layer is in the form of a liner.

16. The tubular article according to claim 1, wherein the jacket material and the adhesive layer are co-extruded.

17. A method of forming a splice seal between two or more wires, comprising the steps of:

heating a heat-shrinkable tubular article having a heat-shrinkable jacket material and a heat-flowable thixotropic inner adhesive layer flowable from shear generated by shrinking of the heat-shrinkable jacket material, the heat-flowable thixotropic inner adhesive layer comprising an additive having untreated silica which provides the adhesive layer with thixotropic properties, the tubular article having at least one of a maximum internal diameter of no more than 15 mm or a maximum length of no more than 100 mm; and causing the heat-shrinkable jacket material to shrink and generate shear on the heat-flowable thixotropic inner adhesive layer to flow and form the splice seal.

18. The method according to claim 17, wherein the heat-shrinkable tubular article has at least one of a maximum diameter of no more than 15 mm or a maximum length of no more than 100 mm.

19. The method according to claim 17, wherein the adhesive has a Melt Flow Index greater than 5.

20. The method according to claim 19, wherein the adhesive has a Melt Flow Index greater than 100.

21. The method according to claim 17, wherein the adhesive is an ethylene vinyl acetate copolymer.

22. The method according to claim 21, wherein the ethylene vinyl acetate copolymer adhesive has a vinyl acetate content of 15% to 40% by weight.

23. The method according to claim 17, wherein the silica has a surface area greater than approximately 100 $m^2/g$.

24. The method according to claim 17, wherein the additive is a high surface area mineral filler.

25. The method according to claim 17, wherein the additive is present at a level of 1% to 15% or 2% to 10% by weight of the adhesive.

26. The method according to claim 17, wherein the tubular article is suitable for splicing together wires of diameter less than 5 mm or less than 3 mm.

27. The method according to claim 17, wherein the tubular article has an internal diameter less than 13 mm.

28. The method according to claim 17, further comprising a transparent heat shrinkable jacket.

29. The method according to claim 17, wherein the adhesive layer is in the form of a liner.

30. The method according to claim 17, wherein the adhesive in the article does not flow at a temperature of 150° C.

31. The method according to claim 17, wherein the adhesive in the article flows at temperatures less than 130° C. under shear.

32. A method of forming a heat-shrinkable tubular article suitable for forming a splice seal between wires, comprising the step of co-extruding a heat-shrinkable jacket material and a heat-flowable thixotropic inner adhesive layer flowable from shear generated by shrinking of the heat-shrinkable jacket material, the heat-flowable thixotropic inner adhesive layer comprising an additive having untreated silica which provides the adhesive layer with thixotropic properties, the tubular article having at least one of a maximum internal diameter of no more than 15 mm or a maximum length of no more than 100 mm.

* * * * *